DETECTOR OF MULTIPLEX STEREOPHONIC SIGNALS

Filed Oct. 20, 1961 2 Sheets-Sheet 1

INVENTOR.
Theodore Bially
BY
Silverman, Mullin & Gass
ATTYS.

March 30, 1965 T. BIALLY 3,176,075

DETECTOR OF MULTIPLEX STEREOPHONIC SIGNALS

Filed Oct. 20, 1961

2 Sheets-Sheet 2

INVENTOR.
Theodore Bially

BY Silverman, Mullin & Gass

ATTYS.

United States Patent Office 3,176,075
Patented Mar. 30, 1965

3,176,075

DETECTOR OF MULTIPLEX STEREOPHONIC SIGNALS

Theodore Bially, Brooklyn, N.Y., assignor to Electronic Instrument Co. Inc., Long Island City, N.Y.

Filed Oct. 20, 1961, Ser. No. 146,545
17 Claims. (Cl. 179—15)

This invention relates generally to apparatus which is designed to be used for the detection of multiplex stereophonic signals received from radio broadcasting stations transmitting with frequency modulation, and more particularly is concerned with apparatus which is intended to be used with existing frequency modulation receivers that were originally designed for the reception only of conventional monophonic signals.

The Federal Communications Commission has recently approved a method of broadcasting stereophonic programs over a single frequency-modulated channel which provides a composite output from the ordinary detector that can be used, if desired, to provide two signals that can be directed to different audio output devices. The specifications of such method are somewhat complex, but basically, for the purpose of the discussion herein, the following may be considered:

(1) The modulating signal for the main channel is the sum of the left and right audio signals. In other words, at the broadcast studio, microphones will be placed right and left, and the signals from the respective microphones are treated separately, as will be obvious. These signals will be referred to herein as L and R. The main channel is the audio signal which will provide the principal modulation of the main carrier (the basic assigned frequency of the broadcast station), and will be used alone if no stereophonic broadcasts are made, or will be received alone if a monophonic receiver is used.

(2) A pilot carrier of 19 kc. modulates the main carrier very substantially less than the main channel.

(3) A sub-carrier is provided of 38 kc. with the carrier, but not the side-bands, suppressed.

(4) The sub-carrier is amplitude modulated by a signal which comprises the difference between L and R.

In receiving the multiplex signal, the conventional monophonic tuner need not be affected in its initial stages, assuming that the broad band characteristics are sufficient to handle the 53 kc. spread that results from the composite multiplex signal (38 kc. of sub-carrier, plus assuming full range of 15 kc. audio signal). Thus, the radio frequency circuitry comprising amplifier, mixer, oscillator; the intermediate frequency amplifier strip; and the limiter and detector of the conventional tuner are used to provide an output composed of the multiplex signal which has been described—namely, the $L+R$ signal, the pilot carrier at 19 kc. and the amplitude modulated $L-R$ signal on the 38 kc. carrier. Additionally, there may be an SCA signal (i.e., an additional sub-carrier which is frequency modulated and designated in the art as SCA) on a carrier at a frequency of about 75 kc. but this does not affect the multiplex reception if properly transmitted and the receiver is properly constructed. SCA is an abbreviation for Subsidiary Communication Authorization and is normally used for background music transmitted by many frequency modulated radio stations.

The basic requirements of the multiplex adapter, in simple language, becomes the following:

The amplitude modulated signal must be provided with a re-inserted carrier of 38 kc. to enable its signal to be detected; the recovered difference signals ($L-R$) out of the detector are added to and subtracted from the sum signals ($L+R$) to provide the complete separation into L and R signals separately; this must be done without losses or phase shift.

The problems which have arisen due to the above requirements are manifold, and while many structures are now appearing on the commercial market that are intended to provide the desired results, it appears that the solution to the problems is not all that one would desire. Two most difficult problems are maintaining complete channel separation over the entire audio spectrum between 50 and 15,000 cycles per second, and the elimination of interference and crosstalk from the SCA channel.

The most common structure that is used to recover the stereophonic information from the composite multiplexed signals that are the output of the ratio detector of the FM tuner consists of isolating the $L-R$ side bands and the $L+R$ direct channel through the use of band-pass and low pass filters, demodulating the $L-R$ sidebands, and matrixing the demodulated side band information with the $L+R$ signal to obtain the left and right channel audio signals, respectively.

These systems are subject to disadvantages because slight errors in the phase relationship between the $L+R$ channel and the $L-R$ side bands place serious limitations upon the theoretically possible channel separation. To alleviate this phase shift, filter designs have gone to linear phase shift, but even this poses problems because of alignment and because exact linearity is expensive to achieve, if achievable at all.

Accordingly, it is the principal object of this invention to provide a structure to process the composite signals comprising the stereophonic information which is in practical considerations devoid of filters and hence devoid of complex linear phase shift circuitry, but which will nevertheless provide outputs representing the L and R audio signals in proper phase relationship one to the other.

A further object of the invention is to provide an adapter for detection of multiplex stereophonic signals in which a synchronous demodulator is used to produce the demodulated $L-R$ sidebands without filters by providing a demodulator switching wave form to the demodulator which has zero average value, albeit a wave form of odd symmetry.

Still a further object of the invention is to provide an adapter for detection of multiplex stereophonic signals in which, through a simplified and novel circuit, not only are the L and R channels faithfully and completely separated for transmission to the output loudspeakers, but in which crosstalk from the SCA band is rejected to a very high degree.

Other objects of the invention are concerned with the novel circuit details and the manner of combining the components of the apparatus to achieve the advantages thereof, and it will be seen that many features not here mentioned will become apparent to those skilled in this art as the specification proceeds.

In connection with the specification, the drawings illustrate a preferred embodiment of the invention which is described hereinafter in considerable detail, but only as an example and not by way of limitation.

FIGS. 4*a* to 4*f* are diagrams used in connection with an explanation of the manner in which the theory of operation was derived, contained in the appendix.

Figures 2, 3, 4A, 4B, 4C, 4D, 4E:
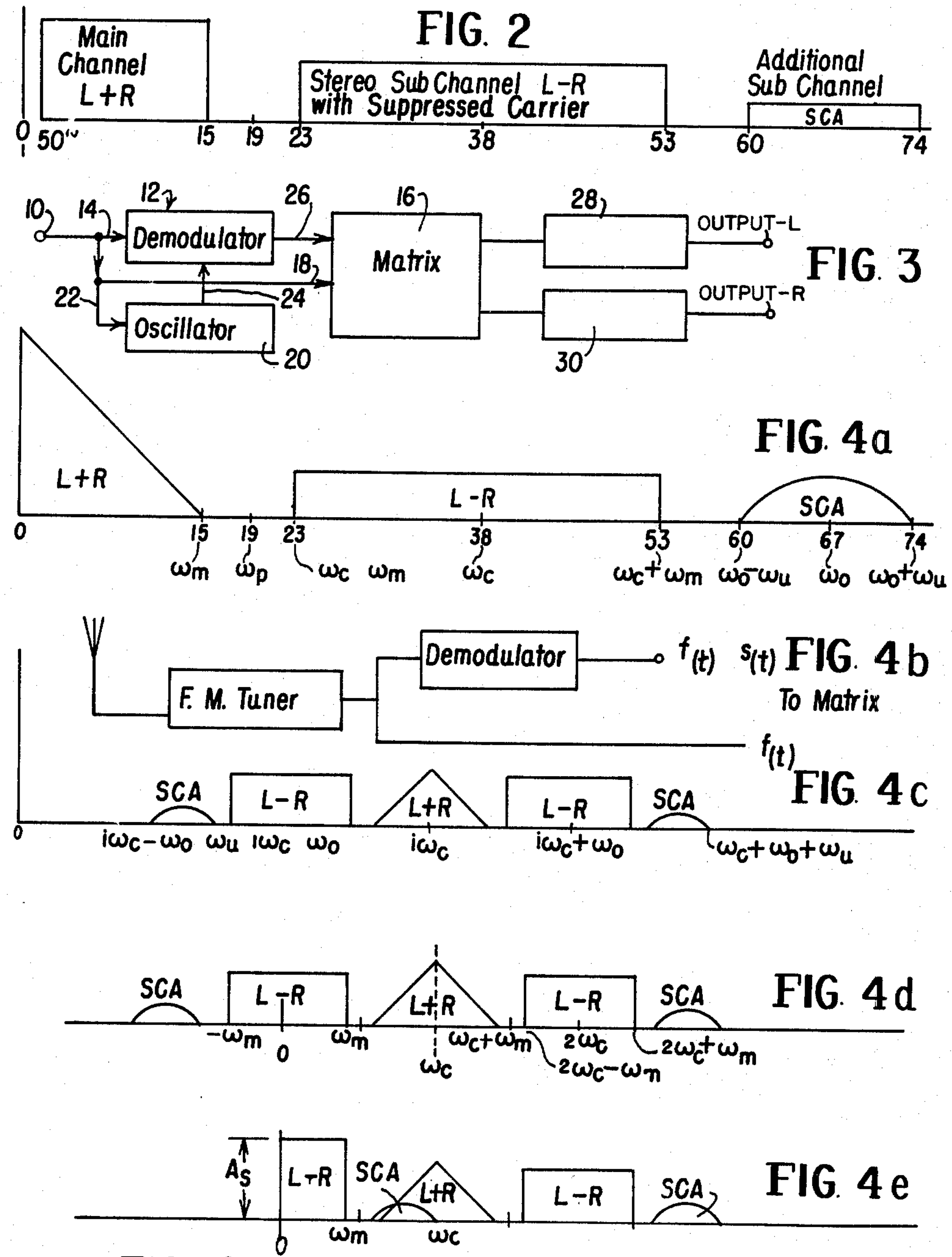
FIG. 2 is a diagrammatic representation of the spectral distribution of the composite signal which is derived from the ratio detector of a conventional frequency modulation tuner that is passing a multiplex frequency modulation signal.
FIG. 3 is a block diagram of the adapter in simplified form.

Reference first may be had to FIG. 2 which is a diagrammatic representation of the spectral distribution of the signals carried by a single frequency modulation channel from a radio station. These are, of course, the modulating signals, the assigned carrier having been removed by the detector of the tuner in a previous stage.

The signal basically comprises three parts. The main channel is audio frequency and may modulate the principal carrier by 100% if used monophonically or as much of 90% if used in a stereophonic broadcast. The pilot carrier is a 19 kc. signal which modulates the principal carrier by a few percent—in the present specification by the Federal Communications Commission—8 to 10%. The so-called stereophonic sub-channel is an amplitude modulated channel extending over the audio range, 15 kc. in each side band, on a carrier of 38 kc. which is suppressed so that only the side bands are transmitted. Note that this sub-channel is on a sub-carrier which is a second harmonic of the pilot carrier. This sub-channel carries the $L-R$ intelligence, and the main channel carries the $L+R$ intelligence. The modulation of the principal carrier by the sub-channel is capable of 90% modulation, but the sum of the side bands causes a peak deviation of the principal carrier of 45% when only L or R is present.

The channel shown at the right and which represents the background music or SCA also broadcast by the radio station is of low modulation, not more than 10% of the principal carrier and is on a subcarrier of the order of 67 kc.

The specifications of the FCC also call for a particular frequency response covering the audio spectrum and pre-emphasis in both the main and the sub-channels. The deemphasis which is required in the adapter or receiver will attenuate certain undesirable interference signals.

By spectrum analysis, it has been found that if the combined signal is applied to a demodulator which is switched with a waveform of odd symmetry and zero average value, the output therefrom will be only the detected $L-R$ side band. The signal thus obtained is matrixed with the $L+R$ signal to achieve the desired output. This analysis is appended at the end of this specification, as a demonstrable proof, and whether the analytical theory is correct or not is believed immaterial. It has been found that the results based upon the application of that which it is believed occurs, are highly successful.

Referring now to the block diagram of FIG. 3, the input terminal 10 is the output from the prior stage that supplies the entire signal from the tuner. This terminal 10 is also shown in the circuit diagram of FIG. 1. The signal is applied to the demodulator 12 by way of the path 14, to the matrix 16 by way of the path 18, and to the 38 kc. carrier recovery means called an oscillator 20 in the block diagram, by way of the path 22. The switching signal from the oscillator 20 is applied to the demodulator 12 by way of the path 24 and the output $L-R$ appears at the path 26 and is applied to the separator 16. The effective signal seen at 18 by the separator is only the audio signal $L+R$. The output from the separator is de-emphasized at 28 and 30 to provide the desired L at terminal 32 and R at terminal 34.

Figure 1:
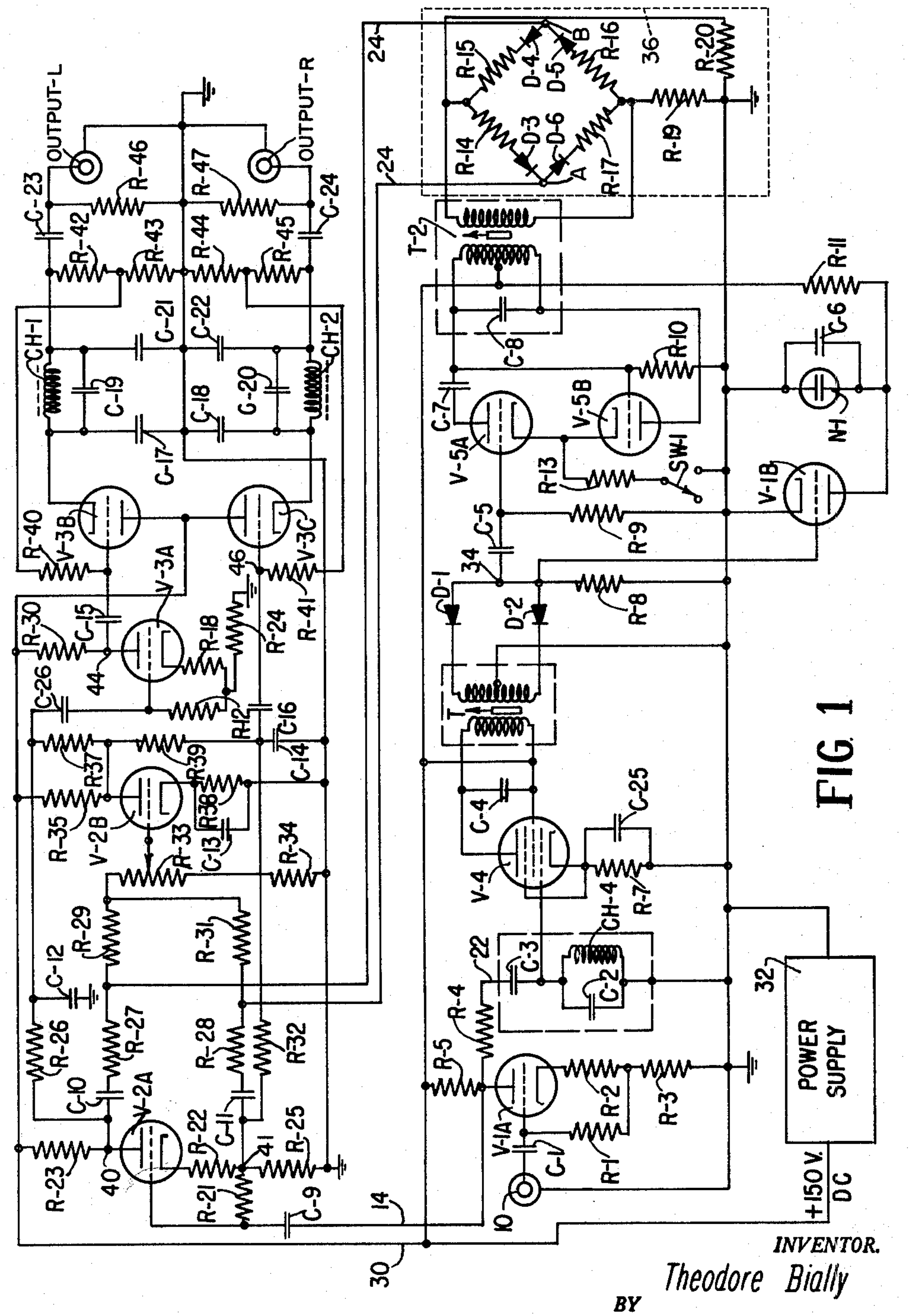
FIG. 1 is a circuit diagram illustrating an adapter for use with a frequency modulation tuner, the said adapter being constructed in accordance with the invention.

Referring now to FIG. 1, the incoming signal which is the complete composite of FIG. 2 appears at the terminal 10 and is coupled through the capacitor C–1 to the grid of the tube V–1A. This is a triode which is connected as a conventional amplifier through suitable grid and cathode resistors R–1, R–2 and R–3. The plate is connected through a suitable dropping resistor R–5 to a B+ supply buss 30 that is energized through a power supply 32 that may either be self-contained in the adapter or a part of the previous component, i.e., the tuner.

The path 22 which extends from the amplifier tube V–1A to the oscillator component generally designated 20 in FIG. 3 and extends between paths 22 and 24 (see FIGS. 1 and 3) includes the resistor R–4 and the coupling condenser C–3 which apply the signal to the grid of the tube V–4, which, as seen, is a pentode. The tuned circuit, consisting of the capacitor C–2 and the choke CH–4, bypasses all signals but the 19 kc. pilot carrier, to ground, so that the tube V–4 amplifies only this signal. The plate of the tube V–4 is connected to the buss 30 to acquire its plate voltage through the primary winding of the transformer T–1, while the screen grid electrode is connected directly to the buss. C–25 and R–7 form a self-bias for the pentode.

The purpose of the transformer T–1 which is tuned to 19 kc. by the condenser C–4 is to provide the needed out-of-phase signals for frequency doubling and to further reject any other signals which get through the amplifier tube V–4. The secondary winding of the transformer T–1 has its center tap grounded, and its opposite terminals connected to the plates of the diodes D–1 and D–2, the cathodes of which are connected to one another and to ground through the load resistor R–8.

The terminal 34 provides a voltage at a frequency of 38 kc. that is applied to synchronize a push-pull oscillator formed of the tubes V–5A and V–5B which operate into a tuned input transformer T–2, tuned to 38 kc. by the condenser C–8. Feedback between tubes is through the condenser C–7.

The 38 kc. output is applied to a so-called ring modulator, or full-wave diode switch modulator, as it is known. This is designated 36 and has the appearance of a bridge, formed of the diodes D–3, D–4, D–5 and D–6 and the resistors R–14, R–15, R–16 and R–17. The upper and lower terminals are connected to ground through suitable resistors R–19 and R–20. The carrier, now 38 kc., is applied at these terminals. The output is a switching signal which has zero average value appearing across the right and left terminals and applied by the leads 24 across the output circuit of the tube V–2A.

The D.C. component which occurs at the terminal 34 is applied to an amplifier tube V–1B, this being a negative potential. The tube V–1B is normally conducting, since its cathode is at ground potential while its grid is at zero potential relative to the cathode by reason of the resistor R–8. When conducting, the plate of the tube V–1B is at a low potential and the voltage across the neon tube N–1 is insufficient to ignite this lamp. When the potential is increased due to the cutting off of the tube V–1B, the neon lamp N–1 ignites, and remains ignited because A.C. signals are by-passed by the condenser C–6, with the current therethrough limited by the ballast resistor R–11. This lamp will remain ignited only so long as a 19 kc. signal is being received by the transformer T–1 and hence the lamp is an indicator that a stereophonic broadcast is in progress.

The amplifier output from the tube V–1A is delivered also to the tube V–2A which is a split load phase inverter. The plate of tube V–1A connects by the lead 14 through the coupling condenser C–9 to the grid of the tube V–2A. The bias of the tube V–2A is obtained through the cathode resistor R–22 and the grid leak resistor R–21 which are maintained in any event above ground by a potential determined by the resistor R–25 (required because a signal is taken off the cathode circuit, as will be explained).

Plate resistor R–23 determines the plate potential of the tube.

The two outputs of the tube V–2A are taken off the plate at 40 and the cathode at 41. These are still the composite signals of FIG. 2, and they differ in phase by 180°. The signal at 40 is out of phase relative to the input signal while that at 41 is in phase.

Reverting once more to the ring modulator 36, the application of the 38 kc. signal output from the transformer T–2 to the upper and lower terminals of the bridge will effectively ground the terminals A and B alternately, with the ungrounded terminal "floating" on alternate half-cycles. The respective impedance to ground of the points A and B on such alternate half cycles is a low value, determined by the parallel network R–14, R–17, R–19 and R–20 in one case, and the parallel network R–15, R–16, R–19 and R–20 in the other case. In the practical device this value was approximately 1500 ohms.

The points A and B are transferred by way of the leads 24 to the output circuits of the split phase inverter V–2A to provide an effective switching signal that alternately samples the two output circuits at a 38 kc. frequency. This switching signal is a square wave of odd symmetry, although the rise and fall characteristics are not perfectly vertical because of the finite switching time of the diodes. Since there is symmetry, the average value of the switching signal is zero.

The signals which appear at the output terminals 40 and 41 are of equal amplitude but opposite phase. The values of circuit constants are chosen with this end result in mind. In the practical circuit, the resistors R–23 and R–25 are 9000 ohms and 9500 ohms respectively, which is necessary because of the manner of operation of the circuit and the fact that there is amplification in the tube. When the plate output of V–2A is being sampled, the point B is floating and the point A is substantially grounded. This means that the resistors R–28 and R–25 are effectively in parallel which thus decreases the effective cathode resistance and causes greater plate output than would be the case if one considered that the cathode resistance was dictated by R–25 alone.

On the other hand, when the cathode output is sampled through grounding of the point B, the resistor R–27 is effectively in parallel with the resistor R–23 causing a change in the effective plate load resistance other than that dictated by the resistor R–23 alone. The effect of this upon the cathode output voltage is much less than the previous effect described, caused by the change in cathode resistance upon the plate output voltage.

During the sampling intervals, therefore, the plate and cathode outputs of the tube V–2A are equal because of the difference in the values of the plate and cathode load resistors. At other times, there will be some inequality due to change in plate voltage with the switching, so that the average plate voltage is somewhat less than the average cathode voltage.

The capacitors C–10 and C–11 are D.C. blocking condensers to prevent the diodes of the modulator ring 36 from being biased by D.C. voltages of the split phase inverter V–2A and the resistors R–27 and R–28 are isolating resistors.

Each of the sampled signals is applied from the points A and B respectively through the resistors R–31 and R–29 to the top end of the voltage divider R–33 and R–34, the resistor R–33 being variable to control the amount of output of the tube V–2B. These sampled signals, therefore, are added in the voltage divider and applied to the tube V–2B which has a self-bias C–13 and R–38 controlled also by the sub-tended portion of the voltage dividers R–33 and R–34. The output appears at the plate.

The adding of the two outputs of the split phase inverter by sampling, as described, is the equivalent of multiplying the composite signal of FIG. 2 by a 38 kc. switching function of zero average value and odd symmetry, the even harmonics being eliminated.

The output of the tube V–2B, therefore, is the signal $L-R$ and it appears at the plate of the tube. Tube V–2B is self-biased by the by-passed resistor R–38 and condenser C–13, with the voltage divider R–33 and R–34 providing some of the cathode-grid resistance. There will be some inaudible signals also passing through the tube. Control of the amplitude of the signal is achieved, as mentioned, by variation of the variable resistor R–33.

The plate and cathode of the tube V–2A have the unaltered composite signals of FIG. 2 appearing respectively thereat, the isolation resistors R–27 and R–28 preventing any substantial effect caused by the operating of the ring modulator 36. The audible portion of the composite signal comprises $L+R$ and this appears at the plate 40 (there having been an inversion of the signal in the first amplifier tube V–1A prior to application to the grid of V–2A) while the same signal 180° out of phase appears at the cathode at 41. This signal is $-(L+R)$.

Separation occurs by adding the outputs of the tube V–2A and the tube V–2B. From the plate of the tube V–2A at terminal 40, one end of resistor R–26 is connected thereto and the other end is connected to capacitor C–12 and to the top end of the resistor R–37 which connects with the plate of the tube V–2B. Plate load resistor R–35 controls the characteristics of the plate circuit of the tube.

The resulting signal comprises $(L-R)$ from the plate of V–2B plus $(L+R)$ from the plate 40 giving an output consisting of 2L which is coupled through the condenser C–26 to the grid of the tube V–3A.

Separation also occurs by adding the outputs at 41 and the plate of tube V–2B to give another signal. The output from terminal 41 is $-(L+R)$ while the output from the plate of tube V–2B is still $(L-R)$ so that adding results in an output signal consisting of −2R at the junction of the resistors R–32 and R–39. Note that R–32 is also by-passed to ground through C–14.

The by-passing condensers C–12 and C–14 provide the de-emphasis requirements of the originally transmitted signal. The resistors R–26 and R–32 are 100,000 ohms each in the practical example, and the capacitors C–12 and C–14 are .0015 microfarad, while each of the resistors R–37 and R–39 is of the order of 100,000 ohms. The de-emphasis time for these networks is thus about 75 micro-seconds. This is an effective filter for ultra-sonic signals produced by demodulation.

As previously mentioned, the average plate voltage of V–2A was somewhat less than the average plate voltage of the cathode of V–2A. To achieve optimum separation in both channels, it is essential to add the outputs from the tube V–2A to $L-R$ with identical amplitudes with the same setting of R–33. This can be achieved by adding more of the $L-R$ output from the tube V–2B to the plate signal than to the cathode signal, and hence, it is advantageous to have the value of the resistor R–37 a few percent more than the value of the resistor R–39.

The signal at the junction of resistors R–39 and R–32 is coupled through the condenser C–16 to the grid of the tube V–3C whose plate is connected to the 150 volt buss 30. This tube is a triode connected as a cathode follower, and hence the output is taken from the cathode and connected to the output terminal, Output-R. This is the right hand channel and will produce signals picked up by the right hand microphone of the studio.

The signal which has been described as 2L is applied to the amplifier tube V–3A. This tube is biased by resistors R–12, R–18 and R–24 and its plate is connected by the 150 volt buss 30 through the dropping resistor R–30. The output of this tube appears at the terminal 44 at which point it is of substantially the same amplitude and phase as the signal appearing at the terminal 46. The tube V–3A thus functions as a phase inverter, and the amplification which is desired in the tube is negligible. Tube V–3B is the equivalent of the tube V–3C, being a cathode follower for the signal 2L. The cathode output of this tube in thus connected to the output terminal, Output–L, which is the left hand channel and will produce signals picked up by the left hand microphone in the studio of the broadcasting station.

The phase inverter V–3A is a refinement which restores proper phase relations in the output signals, making the apparatus compatable with other stereophonic equipment, such as tape decks and the like, for proper speaker phasing. It can be eliminated in economical apparatus, with some sacrifice of quality, however.

The resistors R–41 and R–40 are grid leak resistors, while the resistors R–42, R–43, R–44, R–45 are biasing resistors for the cathode follower tubes V–3B and V–3C. The use of cathode followers is indicated for low input impedance stages following the adapter, although other forms of output may be used if desired. The bias is applied through the chokes *Ch*–1 and *Ch*–2.

The networks in each output stage are formed of the chokes *Ch*–1 and *Ch*–2 with their associated capacitors C–17, C–18, C–19, C–20, C–21 and C–22 and other components, including resistors R–46 and R–47 as well as capacitors C–23 and C–24. These networks are for filtering the output signals to eliminate as much as possible the effects of higher than audio signals. Such effects can be deleterious where the equipment following the adapter includes tape recorders which have high frequency biases.

The channel separation is controlled by the variable resistor R–33 which varies the amount of *L—R* signal available at the separation points. The output signal level, under conditions of optimum separation, is thus determined by the direct *L+R* component and is virtually independent of the phase of the re-injected barrier. An error in the phase of the injected carrier will simply require a higher setting of the separation control to achieve the same output amplitude and channel separation that would be obtained under optimum carrier phase condition.

It will be noted that a switch *Sw*–1 is provided which grounds the cathode of the tube V–5B through the resistor R–13, thereby rendering the oscillator inoperative. The purpose of this switch is to cut off the 38 kc. signal in the event that it is insufficient to properly synchronize the oscillator. Obviously, this means that there will be no de-modulation and the *L+R* signal will simultaneously be fed to both channels, the condition of monaural reception. The oscillator will synchronize on weak stations, but under certain circumstances a monaural broadcast with SCA side bands in the region 23 to 53 kc. will be demodulated by the action of the oscillator and give annoying audio output noises if the 38 kc. oscillator is operative. Under such circumstances, the oscillator can be cut off.

As mentioned previously in the specification, the basic concept of the invention is the provision of a circuit in which the demodulator is switched with a wave form of odd symmetry and zero average value to give the desired results without the need for filters or complex rejection networks. One of the important advantages of this invention is that it enables the circuit to be quite simple and utilize a minimum of tubes. For example, the actual device, as illustrated in FIG. 1, used only five envelopes for all of the tubes shown. The tubes V–1A and V–1B functioned as pre-amplifier and indicator driver, and were in one envelope. Obviously, these are not essential to the accomplishment of the desired results. The tube V–4 was the only single component envelope, functioning as an amplifier preceding the oscillator. The two tubes of the oscillator V–5A and V–5B were in a single envelope. Any oscillator circuit would be suitable. The three tubes comprising the two cathode followers V–3B and V–3C and the phase inverter V–3A were all in the same envelope.

The important functions which are to be accomplished in the apparatus are demodulation, separation and deemphasis. All of these are accomplished by two tubes V–2A and V–2B in a single envelope. A great economy is thereby achieved.

In order to explain the reason for the operativeness of the invention, resort may be had to a fairly rigorous mathematical analysis which is outlined in the appendix that follows, and in connection with which reference may be had to the views of the drawings, which are designated as FIGS. 4*a*, 4*b*, 4*c*, 4*d*, 4*e*, and 4*f*.

*Appendix*

In the several figures reference may be had to a notation which is used in this analysis, applied to a spectral distribution which is the equivalent of that shown in FIG. 2, but in which the various channels are given different geometric configurations to enable them to be identified at a glance. Thus, in the parts of FIG. 4, the main audio channel is a triangle, identified as *L+R*, the stereophonic sub-channel is a rectangle identified as *L—R*, and the background music channel is a semi-circle identified as SCA.

The various frequencies of the composite signal, which is illustrated in FIG. 4*a*, are noted as follows for the purpose of this analysis:

$\omega_p = 2\pi \times 19{,}000$ radians/second = pilot frequency
$\omega_c = 2\pi \times 38{,}000$ radians/second = subcarrier frequency
$\omega_m = 2\pi \times 15{,}000$ radians/second = upper audio frequency limit
$\omega_o = 2\pi \times 67{,}000$ radians/second = SCA subcarrier frequency
$\omega_u = 2\pi \times 7{,}000$ radians/second = upper SCA audio frequency limit If the left channel audio signal is $$(1) \qquad \sum_{k=1}^{m} A_k \cos(\omega_k t + \phi_k)$$

The right channel signal is $$(2) \qquad \sum_{n=1}^{m} A_n \cos(\omega_n t + \phi_n)$$

And the SCA audio signal is $$(3) \qquad \sum_{j=1}^{\mu} A_j \cos(\omega_j t + \phi_j)$$

Then the composite signal $(f(t))$ which is available at the ratio detector output, and is applied to the terminal 10 is:

$$(4) \qquad \sum_{k=1}^{m} A_k \cos(\omega_k t + \phi_k) + \sum_{n=1}^{m} A_n \cos(\omega_n t + \phi_n)$$
$$+ A_p \cos \omega_p t$$
$$+ \tfrac{1}{2} \sum_{k=1}^{m} A_k [\cos[(\omega_c + \omega_k)t + \phi_k] + \cos[(\omega_c - \omega_k)t - \phi_k]]$$
$$- \tfrac{1}{2} \sum_{n=1}^{m} A_n [\cos[(\omega_c + \omega_n)t + \phi_n] + \cos[(\omega_c - \omega_n)t - \phi_n]]$$
$$+ \tfrac{1}{2} \sum_{j=1}^{\mu} A_j [\cos[(\omega_o + \omega_j)t + \phi_j] + \cos[(\omega_o - \omega_j)t - \phi_j]]$$

In the above Expressions 1 through 4:

*k, n, j* are indices of summation;
A is the amplitude of a frequency component;
*t* is time in seconds;
*k, n, j* are the radian frequencies, respectively, of the *k*th, *n*th and *j*th frequency components;
$\phi$ represents the phase angle of the respective components.

The analysis which is contained herein is based upon the assumption that the tuner which receives the radio signals passes them to the adapter without distortion of any kind.

The function described in (4) above is an expression for the signal which is referred to in this specification as the composite signal. It is illustrated in FIG. 2 and in the special notation of this analysis in FIG. 4*a*.

Upon demodulation, the composite signal is effectively multiplied by the demodulator switching function $S(t)$, i.e., the modulator output is the product $f(t) \cdot S(t)$. This is diagrammatically illustrated in FIG. 4*b* showing a highly simplified block diagram of the entire receiving apparatus before the mixing means or separator.

The function S(t) in its most generalized form may be expressed as a periodic waveform having fundamental frequency $\omega_c$:

$$(5) \qquad S(t)=\sum_{i=0}^{\infty} A_i \cos(i\omega_c t+\phi_i)$$

The spectrum of $f(t)\cdot S(t)$ may be determined by algebraically adding the spectra resulting from the individual products of $f(t)$ with each of the spectral components of S(t).

Each such product $f(t)A_i \cos(i\omega_c t+\phi_i)$ yields the following distribution shown in FIG. 4c.

Note that the $f(t)$ spectrum has been translated to the frequency $i\omega_c$ and is symmetrically distributed about this point. The amplitude of the translated spectrum relative to the original $f(t)$ spectrum is $A_i/2$.

The fundamental $\omega_c$ component of S(t) translates the $f(t)$ spectrum to the position shown in FIG. 4d.

The portion of the spectrum which falls in the "negative" frequency region can be drawn in the "positive" frequency domain as shown in FIG. 4e.

Since the $L-R$ information on the negative frequency axis is the exact mirror image of that on the positive frequency axis, the amplitude ($A_s$) of the resultant positive $L-R$ spectrum is a function of the relative phases of the negative and positive frequency contributions. In particular, the translated $L-R$ spectrum will vary in amplitude as the cosine of the phase angle $\phi_i$ of the fundamental component of S(t). In order to obtain maximum sideband recovery, the phase of the fundamental component of S(t) should be identical with that of the subcarrier at the transmitter.

It is the purpose of the demodulator to deliver only the detected $L-R$ sidebands in the audio region $0\rightarrow\omega_m$. This has been accomplished by the fundamental component of S(t). It will be seen by analysis below that none of the other spectral components of S(t) will deliver outputs in the 0 to $\omega_m$ band.

The $i=0$ (D.C.) component of S(t) effects no translation of the input spectrum but simply alters its amplitude by the factor $A_o$; the output of the demodulator due to the D.C. component ($A_o$) of S(t) is $A_of(t)$. This contains the $L+R$ information in the region between zero and $\omega_m$. In order to obtain *only* the demodulated $L-R$ side bands in this region, the $A_o$ term of S(t) should be zero.

As was previously pointed out, each spectral component of S(t) produces an output which is symmetrical about that component in frequency. In fact, it is clear that each component of S(t) yields an output of bandwidth twice that of $f(t)$. The input signal bandwidth is $\omega_o+\omega_u$ radians/second, or 74 kc., so that for each component $i\omega_c$ there will appear at the demodulator output a signal whose spectrum lies between the limits $$i\frac{\omega_c}{2\pi}\pm 74 \text{ kc.}$$

where $$\frac{\omega_c}{2\pi}=38 \text{ kc.}$$

Those components of S(t) which are sufficiently high in frequency so that $$i\frac{{}_c\omega}{2\pi}=74 \text{ kc}>15 \text{ kc.}$$

will deliver no output in the 0 to $\omega_m$ (0 to 15 kc.) region. In other words, $$i\frac{\omega_c}{2\pi}$$

must be greater than 74+15=89 kc. in order to produce no audible output signals.

Since $$\frac{\omega_c}{2\pi}=18 \text{ kc.}$$

$$i>\frac{89}{39}=2.35$$

However, $i$ can assume only integral values so that for $i>3$ there will be no audible response. The second harmonic ($i=2$) of S(t) must be suppressed, since this component delivers an output in the 0 to 15 kc. region.

Figure 4F:
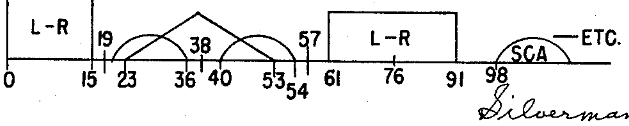

The spectrum of the output signal of a demodulator which satisfies the aforementioned requirements appears as illustrated in FIG. 4f.

Note that the $L-R$ information is the only audible component of this signal.

Since the separation process effects no spectral translation, the audible output of a matrixing circuit will be composed only of the audible components of the input signals. The only audible components of the original ($f(t)$) and demodulated ($f(t)\cdot S(t)$) composite signals are ($L+R$) and ($L-R$) respectively, so that the L and R channels may be obtained from these by addition:

$$(L+R)+(L-R)=2L$$

$$(L+R)-(L-R)=2R$$

This occurs in the manner described above.

It will be understood that the invention is capable of considerable variation without in any way deviating from the spirit or scope thereof as defined in the appended claims. The frequencies and circuit constants which are specified are based, respectively, upon the present Federal Communications Commission regulations and the application of the principles of the invention to a specific example of apparatus to be used. Changes in frequencies and regulations will demand alterations in circuit constants and details, but not in the basic concept.

The practical example used vacuum tubes commercially available, such as 12AU7, 12AT7, 6AU6 and 6D10. But for the 6AU6 these were multiple unit tubes, but single tubes in individual envelopes will operate as efficiently. The circuit constants of the apparatus are readily ascertained by those skilled in the art.

It is desired also to point out that the invention includes adaptation of the electronic tube circuitry to the use of semi-conductors such as transistors operating to perform the same functions described.

What it is desired to secure by Letters Patent of the United States is:

1. A structure for separating the audio frequency intelligence channels in a multiplex stereophonic composite signal formed at least of a main audio channel having an $L+R$ signal, a higher frequency pilot channel having a pilot carrier signal, a sub-channel having an $L-R$ signal modulated on a suppressed carrier of frequency a multiple of the pilot carrier signal frequency, comprising, a common input path for receiving said composite signal from a previous stage, means selective to pass only said pilot carrier signal and to multiply the frequency thereof by said multiple, an oscillator of push-pull type tuned to provide an output of said suppressed carrier frequency and connected to be triggered by the multiplied pilot carrier signal, said oscillator having a pair of phase output terminals and the oscillations appearing across said terminals, a ring modulator having two input and two output terminals with the oscillator output terminals coupled to said modulator input terminals, and a switching signal appearing alternately at said modulator output with the maximum and minimum amplitudes occurring at the rate of said suppressed carrier frequency on a base line to provide zero average value and asymmetry, a demodulator connected with said common path and providing three output channels, one pair of which have equal amplitude and opposite phase signals therein, the modulator output terminals being connected to said pair of output channels respectively whereby alternately to sample the same in synchronism with said switching signal, means for mixing the sampled signals to provide one audio signal whose principal component is the $L-R$ signal, separating means, the third output channel and the last-mentioned one audio signal being connected to said separating means, and independent output terminals connected to the output of said separating means and providing separated L and R signals respectively thereat.

2. A structure, as claimed in claim 1, in which the multiple is two and said selective and multiplying means comprise at least one circuit tuned to reject all frequencies but said pilot carrier frequency and a diode frequency doubler circuit.

3. A structure, as claimed in claim 1, in which the ring modulator comprises a diode bridge of four branches with the two input terminals being formed at the junction of pairs of branches and are connected to a very low potential point, while the two output terminals are connected to said pair of demodulator output channels, and the polarities of said diodes are arranged so that each of the output terminals is alternatively floating and connected to said low potential point.

4. A structure, as claimed in claim 1, in which said demodulator comprises a split phase inverter having said three output channels in its cathode and plate circuits and said pair include one each in said cathode and plate circuits respectively.

5. Apparatus for separating the audio frequency R and L channels of a stereophonic multiplexed composite signal comprising: a main audio $L+R$ signal, a pilot carrier signal of higher frequency, a second audio $L-R$ signal but amplitude modulated in said composite signal by a suppressed carrier twice the frequency of the pilot carrier signal and a Subsidiary Communication Authorization SCA signal of higher frequency than the second signal, said apparatus comprising: a split phase inverter having a first output channel and a second output channel, means for coupling the composite signal to the input of said inverter to drive the same, said first and second output channels having signals appearing thereon derived from said composite signal of equal amplitude but opposite phase, a third output channel connected to said inverter and arranged to have a third signal of equal amplitude appearing thereon of phase of the signal of one of the other channels, a modulating apparatus connected to be driven by said pilot carrier signal and having a pair of output terminals, means for producing a switching signal at said terminals which is of zero average value and odd symmetry, the terminals being connected to said pair of channels respectively and being isolated from said split phase inverter whereby the switching signal alternately samples the signals of the channels of said pair, means for adding the sampled signals, and means for combining the resulting added signal with the signal of said third channel to provide an L and an R output independently separated.

6. Apparatus, as claimed in claim 5, in which one of said outputs is applied to a phase reversal stage.

7. Apparatus for the separation of multiplex stereophonic signals in which there is a composite input signal that has a main audio frequency channel containing the $L+R$ signal, a pilot carrier signal channel of higher frequency than the main audio frequency channel, a second audio frequency channel containing the $L-R$ signal amplitude modulated on a suppressed carrier of frequency an integral multiple of the pilot carrier frequency, said apparatus comprising: an oscillator connected to be driven by said pilot carrier channel signal at the frequency of said suppressed carrier, a modulator triggered by said oscillator and providing a pair of terminals whose potentials alternately vary between relatively high and low values at the oscillator frequency, amplifier means providing a pair of output channels of substantially equal amplitude but opposite phase, means for applying said composite input signal to said amplifier means connecting the pair of terminals to said pair of output channels whereby to sample said output channels alternatively at a rate equal to said oscillator frequency, means for mixing the sampled signals together to provide an audio frequency output containing the $L-R$ signal, separation means, an electrical path for connecting said composite input signal to said separator means substantially directly, means connecting the $L-R$ signal resulting from said mixing to said separator means, said separator means arranged to separate the signals applied thereto into independent L and R signals, and independent output terminals for said L and R signals.

8. Apparatus, as claimed in claim 7, in which means are provided in said pair of output channels for isolating the amplifier means from said modulator.

9. Apparatus, as claimed in claim 7, in which filter means are provided between said separator means and said output terminals for removing frequencies higher than audio from said L and R signals.

10. Apparatus, as claimed in claim 7, in which said amplifier means comprises a split phase inverter and the pair of output channels are respectively the plate output circuit and cathode output circuit thereof, and in which the means for mixing the sampled signals comprises a voltage divider and second amplifier means having the voltage divider in the input circuit thereof.

11. Apparatus, as claimed in claim 7, in which one of said L and R signals is applied to a phase inverter before its output terminal.

12. Apparatus, as claimed in claim 7, in which the said electrical path for connecting the composite input signal to said separator means substantially directly comprises a third output channel connected with one of said plate output circuit and cathode output circuit, whereby the audio frequency signal supplied thereby will constitute substantially the $L+R$ signal.

13. Apparatus, as claimed in claim 7, in which the modulator comprises a diode ring modulator having the output of said oscillator connected across two opposite terminals and the other two opposite terminals comprising said pair.

14. Apparatus, as claimed in claim 7, in which said separator means are provided with capacitive de-emphasis means.

15. Apparatus, as claimed in claim 7, in which means are provided selectively to disable said oscillator.

16. In an apparatus for the separation of multiplex stereophonic signals including: a composite stereophonic input signal having a main audio frequency signal channel formed of $L+R$ intelligence, a pilot carrier signal, a second audio frequency channel formed of ampiltude modulated $L-R$ intelligence on a suppressed sub-carrier that is twice the frequency of said pilot carrier signal, means being provided for separating said pilot signal from said composite signal, means being provided for deriving said $L-R$ intelligence, and mixing means being provided for mixing at audio frequencies said $L+R$ with said $L-R$ to produce a pair of outputs respectively having an L only signal and an R only signal available thereat, said means for providing said $L-R$ intelligence comprising: an oscillator driven by said pilot signal to provide a switching signal of substantially zero average value; a synchronous demodulator connected to receive said composite signal and said switching signal; and means being included in said demodulator to utilize said switching signal for producing from said composite signal an output signal having substantially only audio demodulated $L-R$ intelligence, said demodulator being connected to apply said $L-R$ output signal to said mixing means.

17. In an apparatus as claimed in claim 16, wherein said composite signal includes a "Subsidiary Communication Channel," SCA channel, said oscillator providing a switching signal of substantially zero average value and odd symmetry at a frequency equal to said suppressed carrier, the second harmonic of said switching signal being capable of causing cross-talk when combined with said SCA channel, said switching signal being of substantially odd symmetry to eliminate said second harmonic and to prevent thereby said cross-talk when said means being included in said demodulator utilizes said switching signal of substantially zero average value and odd symmetry for producing substantially only audio demodulated intelligence from said composite signal.

References Cited by the Examiner

UNITED STATES PATENTS

| | | | |
|---|---|---|---|
| 1,742,902 | 1/30 | Deloraine et al. | 179—15 |
| 2,698,379 | 12/54 | Boelens et al. | 179—15 |
| 3,122,610 | 2/64 | Csicsatka | 179—15 |

OTHER REFERENCES

Mergner: "Product Detector for FM-Stereo," Audio, August 1961, pp. 23–25 and 102 relied on.

Eilers: "FM-Stereo: Time-Division Approach," Audio, August 1961, pp. 20–22 and 96 relied on.

DAVID G. REDINBAUGH, *Primary Examiner.*

ROBERT H. ROSE, *Examiner.*